United States Patent
Cohen

(10) Patent No.: US 8,954,951 B1
(45) Date of Patent: Feb. 10, 2015

(54) STOP DISTRIBUTION OF APPLICATION UPDATES

(71) Applicant: Google Inc., Mountain View, CA (US)

(72) Inventor: Gabriel Cohen, Alameda, CA (US)

(73) Assignee: Google Inc., Mountain View, CA (US)

( * ) Notice: Subject to any disclaimer, the term of this patent is extended or adjusted under 35 U.S.C. 154(b) by 119 days.

(21) Appl. No.: 13/859,024

(22) Filed: Apr. 9, 2013

(51) Int. Cl.
*G06F 9/44* (2006.01)
*G06F 9/445* (2006.01)

(52) U.S. Cl.
CPC ............................. *G06F 8/65* (2013.01)
USPC ............................. 717/170; 717/168

(58) Field of Classification Search
CPC .......................................................... G06F 8/65
USPC ................................................. 717/170, 168
See application file for complete search history.

(56) References Cited

U.S. PATENT DOCUMENTS

| | | | | |
|---|---|---|---|---|
| 8,381,208 | B2 * | 2/2013 | Burke et al. | 717/174 |
| 8,413,135 | B2 * | 4/2013 | Aaron | 717/174 |
| 8,423,993 | B2 * | 4/2013 | Faus et al. | 717/173 |
| 8,448,160 | B2 * | 5/2013 | Vincent et al. | 717/168 |
| 8,782,635 | B2 * | 7/2014 | Burke et al. | 717/174 |

* cited by examiner

*Primary Examiner* — Philip Wang
(74) *Attorney, Agent, or Firm* — Morris & Kamlay LLP

(57) ABSTRACT

A communication device may determine whether an installed application should be updated based on an uninstall and/or reinstall history of the application and control distribution of updates to the installed application based on the determination. A frequency at which the application is uninstalled and/or reinstalled on the communication device or other device utilized by the user of the communication device may be determined based on the monitored usage of the application. The distribution of the updates to the application may be discontinued when the frequency exceeds a particular threshold. The distribution of the updates may continue when the frequency is below the particular threshold. A version number of the installed application may be compared to a corresponding version number of a version of the application that is stored on a remote server in order to determine when the update to the application is available for distribution.

21 Claims, 3 Drawing Sheets

STOP DISTRIBUTION OF APPLICATION UPDATES

CROSS-REFERENCE TO RELATED APPLICATIONS/INCORPORATION BY REFERENCE

Not Applicable.

FIELD

Certain embodiments of the disclosure relate to communication. More specifically, certain embodiments of the disclosure relate to a method and system for stopping distribution of application updates.

BACKGROUND

In conventional systems, game developers have to create multiple versions of a native gameplay experience for standalone contexts on devices such as mobile and tablet play, web browser embedding, TV connections and desktop software. Furthermore, as a user transitions among a plurality of devices, the user has to manually switch to a preferred one of the plurality of devices and load the game.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method is provided for stopping distribution of application updates, substantially as shown in and/or described in connection with at least one of the figures, as set forth more completely in the claims.

These and other advantages, aspects and novel modules of the present disclosure, as well as details of an illustrated embodiment thereof, will be more fully understood from the following description and drawings.

DETAILED DESCRIPTION

Certain embodiments of the disclosure may be found in a method and system for stopping distribution of application updates. In various embodiments of the disclosure, a communication device is operable to determine whether an application that is installed on the communication device should be updated based on an uninstall and/or reinstall history of the application on the communication device and/or an uninstall and/or reinstall history of the application on other communication devices that may be utilized by a user of the mobile communication device 202. Distribution of updates to the installed application may occur based on the determination. The usage of the application on the communication device and/or the other communication devices that may be utilized by a user may be monitored and based on the monitored usage, a frequency at which the application is uninstalled and/or reinstalled on the communication device and/or the other communication devices that may be utilized by a user may be determined. The distribution of the updates to the application may be discontinued if the determined frequency at which the application is uninstalled and/or reinstalled on the communication device and/or the other communication devices that may be utilized by a user exceeds a particular threshold. The distribution of the updates to the application may continue if the determined frequency at which said installed application is uninstalled and/or reinstalled on the communication device is below the particular threshold. A version number of the installed application may be compared to a version number for a corresponding application that is stored on a remote server to determine when the update to the application is available for distribution.

Figure 1:
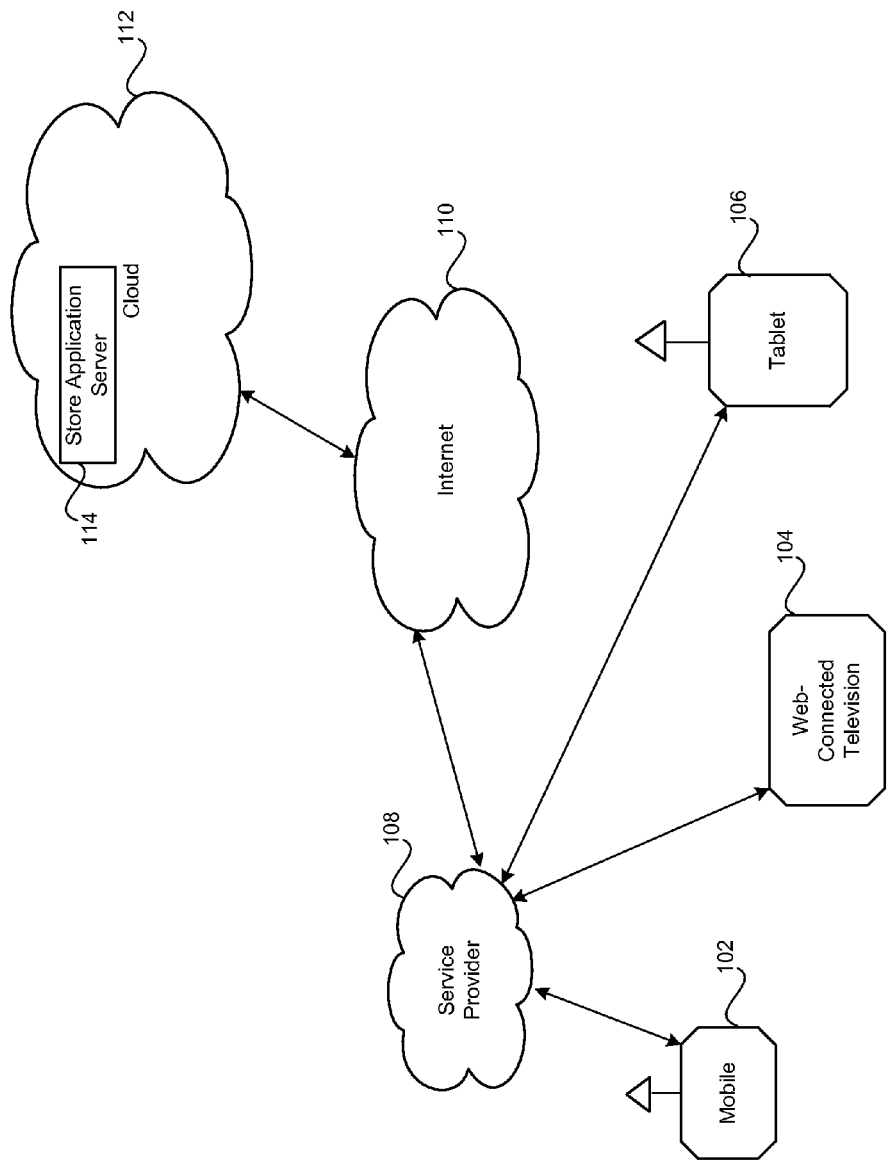
FIG. 1 is a block diagram of an example system for stopping distribution of application updates, in accordance with an embodiment of the disclosure.

FIG. 1 is a block diagram of an example system for stopping distribution of application updates, in accordance with an embodiment of the disclosure. Referring to FIG. 1, there is shown a mobile communication device 102, a web-connected television 104, a tablet 106, a service provider 108, the Internet 110, a cloud 112 and a store application server 114.

The mobile communication device 102 may comprise suitable logic, circuitry, interfaces and/or code that may be operable to run one or more applications. The mobile communication device 102 may be operable to download one or more application from the store application server 114. The store application server 114 may also provide updates to the applications that are on the mobile communication device 102. The store application server 114 may also be operable to provide updates to an operating system on the mobile communication device 102 as well code and/or data for a new operating system for the mobile communication device 102.

The web-connected television 104 may comprise suitable logic, circuitry, interfaces and/or code that may be operable to receive traditional television services as well as communicate via the Internet 110. In accordance with various embodiments of the disclosure, the web-connected television 104 may comprise an operating system that may be operable to run one or more applications. The web-connected television 104 may be operable to download one or more application from the store application server 114. The store application server 114 may also provide updates to the applications that are on the web-connected television 104. The store application server 114 may also provide updates as well any new operating system code and data to the web-connected television 104.

The tablet 106 may comprise suitable logic, circuitry, interfaces and/or code that may be operable to run one or more applications. The tablet 106 may be operable to download one or more applications from the store application server 114. The store application server 114 may also provide updates to the applications that are on the tablet 106. The store application server 114 may also be enabled to provide updates to an operating system on the tablet 106 as well as code and/or data for a new operating system for the tablet 106.

The service provider 108 may comprise suitable devices and interfaces that may be operable to provide Internet based services to various communication devices. In this regard, the service provider 108 may provide services to the various communication devices using a wired and/or a wireless communication medium. For example, the service provider 108 may provide access to Internet based services hosted by the Internet 110 to each of the mobile communication device 102 and the tablet 106 utilizing wireless technologies. The service provider 108 may also provide access to cloud based services offered by the cloud 112, for example, services offered by the store application server 114. The service provider 108 may provide access to Internet based services as well as cloud based services to the web-connected television 104 utilizing a wired and/or wireless medium. The service provider 108 may comprise a cellular, satellite, cable or DSL service provider.

The Internet 110 may comprise suitable devices and interfaces that enable interconnectivity and communication amongst a network of computers, communication devices and servers. The service provider 108 may be operable to provide access to services on the Internet 110 for each of the mobile communication devices 102, the web-connected television 104 and the tablet 106. The Internet 110 may host one or more application servers and/or game servers that may enable users of the mobile communication device 102, the web-connected television 104 and the tablet 106 to download applications, games, play single player as well as multiplayer games, download music, videos and/or other content.

The cloud 112 may host one or more game servers that may enable users of the mobile communication device 102, the web-connected television 104 and the tablet 106 to play single player as well as multiplayer games. The service provider 108 may be operable to provide access to services in the cloud 112 for each of the mobile communication devices 102, the web-connected television 104 and the tablet 106. The cloud 112 may host the store application server 114. The cloud 112 may be accessible to the mobile communication device 102, the web-connected television 104 and the tablet 106 via the Internet 110. The cloud 112 may host one or more application servers and/or game servers that may enable users of the mobile communication device 102, the web-connected television 104 and the tablet 106 to download applications, games, play single player as well as multiplayer games, download music, videos and/or other content.

The store application server 114 may comprise suitable logic, circuitry, interfaces and/or code that may be operable to serve and/or store applications, music, video and/or other content that may be downloaded by one or more of the mobile communication device 102, the web-connected television 104 and the tablet 106. In an embodiment of the disclosure, the store application server 114 may be operable to store accounting as well corresponding information for content that may be handled by the store application server 114. The store application server 114, which may be located in the cloud 112, may monitor the content such as applications and games purchased by a particular user to enable subsequent updating and/or reinstallation of the application and game on a particular device or other devices utilized by the user. The store application server 114 may be operated by an application service provider.

In operation, one or more of the mobile communication device 102, the web-connected television 104 and the tablet 106 may comprise applications that are handled and/or managed by the store application server 114. For example, the mobile communication device 102, the web-connected television 104 and the tablet 106 may have preinstalled applications that are handled and/or managed by the store application server 114. The mobile communication device 102, the web-connected television 104 and the tablet 106 may also be operable to download applications from the store application server 114. The mobile communication device 102, the web-connected television 104 and the tablet 106 may be operable to monitor when the applications that are on the communication device are uninstalled and/or reinstalled. Based on a corresponding history of the uninstallation and reinstallation, the mobile communication device 102, the web-connected television 104 and the tablet 106 may be operable to control distribution of updates to the applications that are on the mobile communication device 102, the web-connected television 104 and the tablet 106.

Figure 2:
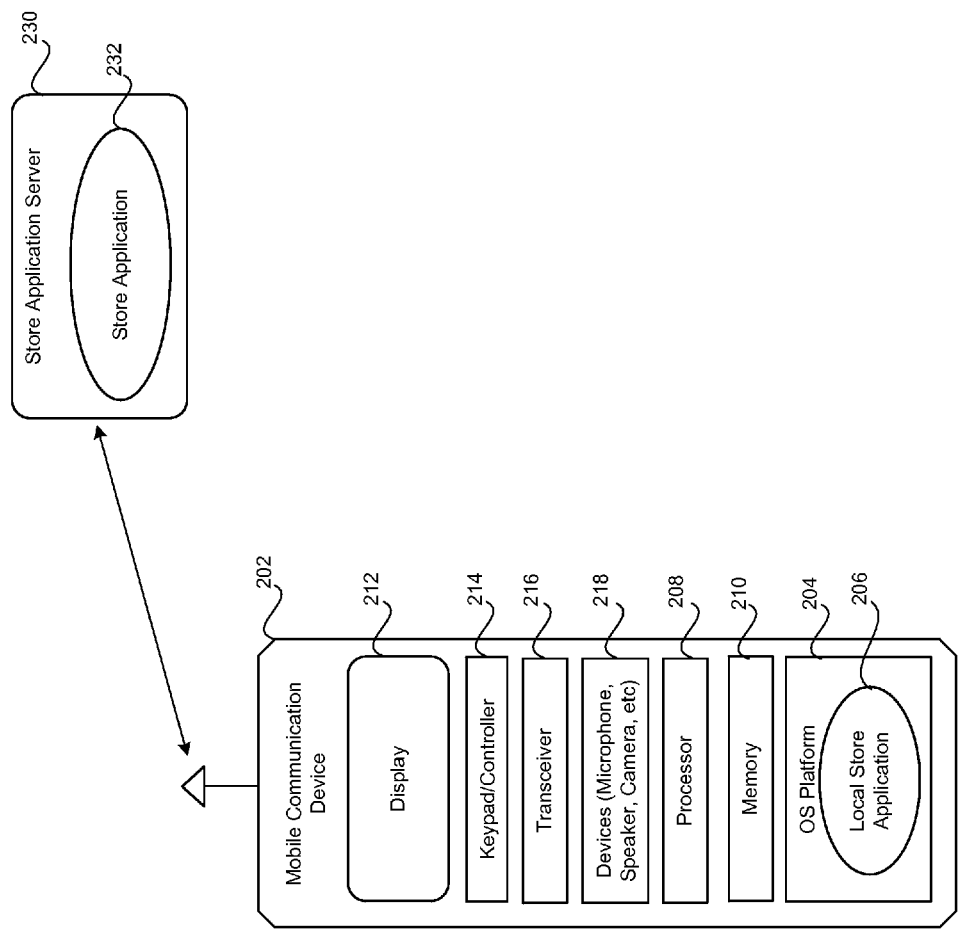
FIG. 2 is a block diagram that illustrates an example system for stopping distribution of application updates, in accordance with an embodiment of the disclosure.

FIG. 2 is a block diagram that illustrates an example system for stopping distribution of application updates, in accordance with an embodiment of the disclosure. Referring to FIG. 2, there is shown a mobile communication device 202 and store application server 230. The mobile communication device 202 comprises an operating system (OS) platform 204, a processor 208, memory 210, display 212, keypad controller 214 and a transceiver 216. The OS platform 204 comprises a local store application module 206. The mobile communication device 202 may also comprise a microphone, speaker and a camera, which are collectively referenced as devices 218. The store application server 230 comprises a store application module 232.

The mobile communication device 202 may comprise suitable logic circuitry, interfaces and/or code that may be operable to communicate utilizing one or more wired and/or wireless technologies. In an example embodiment of the disclosure, the mobile communication device 202 may communicate wirelessly utilizing 802.11a/b/g/n/e, 802.16, 3G, 4G, and Bluetooth. In one embodiment of the disclosure, the mobile communication device 202 may comprise a smartphone. The mobile communication device 202 may comprise an OS platform 204 that is operable to control distribution of updates to applications that are on the communication device 202. The applications that are on the communication device 202 may comprise applications that were preinstalled on the communication device 202 as well as applications that were downloaded and installed on the mobile communication device 202. The mobile communication device 202 may be substantially similar to the mobile communication device 102, which is described with respect to FIG. 1.

The OS platform 204 may comprise suitable logic, interfaces and/or code that may be operable to control operation of the mobile communication device 202. For example, the OS platform 204 may enable a user to interact with mobile communication device 202 and to run or execute applications. The OS platform 204 may also be operable to monitor the applications on the mobile communication device 202. The applications that are on the mobile communication device 202 may comprise applications that were preinstalled on the mobile communication device 202 as well as applications that were downloaded and installed on the mobile communication device 202. In this regard, the OS platform 204 may be operable to determine a history of uninstallation and/or reinstallation for the applications on the mobile communication device 202. In other words, the OS platform 204 may be operable to determine a frequency at which the applications on the mobile communication device 202 are uninstalled and reinstalled. Based on the determined frequency, the OS platform 204 may be operable to control distribution of updates for the corresponding applications on the mobile communication device 202. The OS platform 204 may comprise a local store application module 206.

The local store application module 206 may be integrated as part of the OS platform 204 and may comprise suitable logic, interfaces and/or code that may be operable to handle and/or maintain the applications on the mobile communication device 202 which are handled and/or maintained by the store application server 230. In other words, in some instances, the local store application module 206 may not be an application that runs on the operating system platform 204, but instead, may be integrated as part of the operating system platform 204. The disclosure is not limited in this regard. Accordingly, in other instances, the local store application module 206 may comprise an application that may be running on the OS platform 204. In an example embodiment of the disclosure, the local store application module 206 may enable a user of the mobile communication device 202 to communicate with the store application module 232 in the store application server 230. In this regard, updates to applications on the mobile communication device 202 may be distributed to the mobile communication device 202. The local store application module 206 may enable the mobile communication device 202 to communicate with the store application module 232 in order to handle various services and/or content provided by the store application server 230. In this regard, the local store application module 206 may enable the mobile communication device 202 to communicate with the store application module 232 in order for the mobile communication device 202 to download applications, games, music and/or other content from the store application server 230.

The processor 208 may comprise suitable logic, circuitry, interfaces, and/or code that may be operable to execute code or otherwise control operation of the mobile communication device 202. For example, the processor 208 may be operable to control the OS platform 204, local store application module 206, the memory 210, the display 212, the keypad/controller 214 and the devices 218. In accordance with various embodiments of the disclosure, the processor 208 may be operable to handle execution of operations of the local store application module 206, which may be utilized to control the distribution of updates to the applications that are on the mobile communication device 202. The processor may monitor a history of uninstalls and/or reinstalls and based on the monitored history, the processor may continue or discontinue the distribution of updates to the applications on the mobile communication device 202.

The memory 210 may comprise suitable logic, circuitry, interfaces, and/or code that may be operable to store operating and temporary data for the mobile communication device 202. For example, the memory 210 may be enabled to store configurations and operation data for the mobile communication device 202. The memory 210 may be operable to store OS platform information and data, as well as data utilized by the local store application module 206 controlling the distribution of updates for applications that are on the mobile communication device 202. For example, the monitored history and corresponding frequency of installs, uninstalls and/or reinstalls for various applications in the mobile communication device 202 may be stored in the memory 210.

The display 212 may comprise suitable logic, circuitry, interfaces, and/or code that may be operable to display a user interface that enables a user to interact with the mobile communication device 202. For example, the display 212 may be utilized to configure the mobile communication device 202 as well as provide user interaction when playing a game, and when installing, uninstalling and/or reinstalling an application. In this regard, the display 212 may provide visual and/or touch interface that enables interaction with the mobile communication device 202. The display 212 may comprise LED, LCD or variants thereof.

The keypad controller 214 may comprise suitable logic, circuitry, interfaces, and/or code that may be operable to control and manipulate the communication device 202. In this regard, the keypad controller 214 may be utilized to control applications such as games, which may be running on the communication device 202. The keypad controller 214 may comprise a physical set of keys or buttons, and/or a software generated set of keys.

The transceiver 216 may comprise suitable logic, circuitry, interfaces, and/or code that may be operable to provide wireless communication for the mobile communication device 202. For example, the transceiver 216 may be operable to handle wireless technologies such as 802.11a/b/g/n/e, 802.16, 3G, 4G, and Bluetooth. Although a single transceiver is shown, there may be a plurality of transceivers to handle a plurality of wireless communication technologies.

The mobile communication device 202 may also comprise a microphone, speaker and a camera, which are collectively referenced as devices 218. The microphone and camera may be operable to respectively capture voice and video, for example, when a user of the communication device may be engaged in gameplay and video conferencing. The microphone may capture voice for audio calls. The speaker may be utilized to play audio. In instances where the mobile communication device 202 is a smartphone, the microphone, speaker and/or camera may be integrated as part of the smartphone.

The store application server 230 may comprise suitable logic, circuitry, interfaces and/or code that may be operable to serve and/or store applications and other content, which may be provided to devices such as the mobile communication device 202. The store application server 230 may be operated by an application service provider (ASP), which may rent, sell, and/or provide for free, applications and other content which may be accessible by the mobile communication device 202. The store application server 230 may be operable to handle and/or manage applications and/or other content that may be downloaded to and/or may be running on the mobile communication device 202. Example content may comprise books, magazines and other literature, music, games, video, and so on. In an embodiment of the disclosure, the store application server 230 may be operable to store accounting as well corresponding information that may be related to applications, and/or other content that may be downloaded from the store application server 232 and/or may be running on the mobile communication device 202. The store application server 232, which may be located in the cloud 112, may be operable to monitor the applications, and/or other content that may be rented to, purchased by and/or given for free to a particular user to enable subsequent installation, updates and re-installations on the mobile communication device 202 and/or other devices utilized by a corresponding user of the mobile communication device 202.

The store application module 232 may comprise suitable logic, interfaces and/or code that may be operable to handle operations for the services offered by the store application server 230. In this regard, the store application module 232 may be operable to handle the management of the applications and/or other content that may be downloaded to and/or be running on the mobile communication device 202. The store application module 232 may be operable to communicate with the local store application module 206, which is running on the OS platform 204 of the mobile communication device 202. In this regard, the store application module 232 may enable the mobile communication device 202 to communicate with local store application module 206 in order for the mobile communication device 202 to download applications, games, music and/or other content from the store application server 230. In an example embodiment of the disclosure, the store application module 232 may enable a user of the mobile communication device 202 to communicate with the store application module 232 in the store application server 230 in order to control the distribution of updates to applications that are on the mobile communication device 202.

In operation, the local store application module 206 may be operable to monitor the usage of the applications on the mobile communication device 202. In this regard, the local store application module 206 may be operable to monitor a frequency at which the applications on the mobile communication device 202 are uninstalled and/or reinstalled on the mobile communication device 202. Based on the frequency at which the applications on the mobile communication device 202 are uninstalled and/or reinstalled on the mobile communication device 202, the local store application module 206 may communicate with the store application module 232 to control the distribution of updates to the applications that are on the mobile communication device 202. The local store application module 206 may notify the store application module 232 to discontinue distribution of the updates to a particular application if the determined frequency at which that application is uninstalled and/or reinstalled on the mobile communication device 202 exceeds a particular threshold. The local store application module 206 may notify the store application module 232 or otherwise allow the store application module 232 to continue distribution of the updates to a particular application if the determined frequency at which that particular application is uninstalled and/or reinstalled on the mobile communication device 202 exceeds a particular threshold. The processor 208 may be operable to determine a version number of the application that is on the mobile communication device 202 and compare it to a version number for a corresponding application that is stored on the store application server 232 to determine when the update to the application is available for distribution. The processor 208 may communicate with the store application module 232 in order to acquire the version number for the corresponding application that is stored on the store application server 232.

Figure 3:
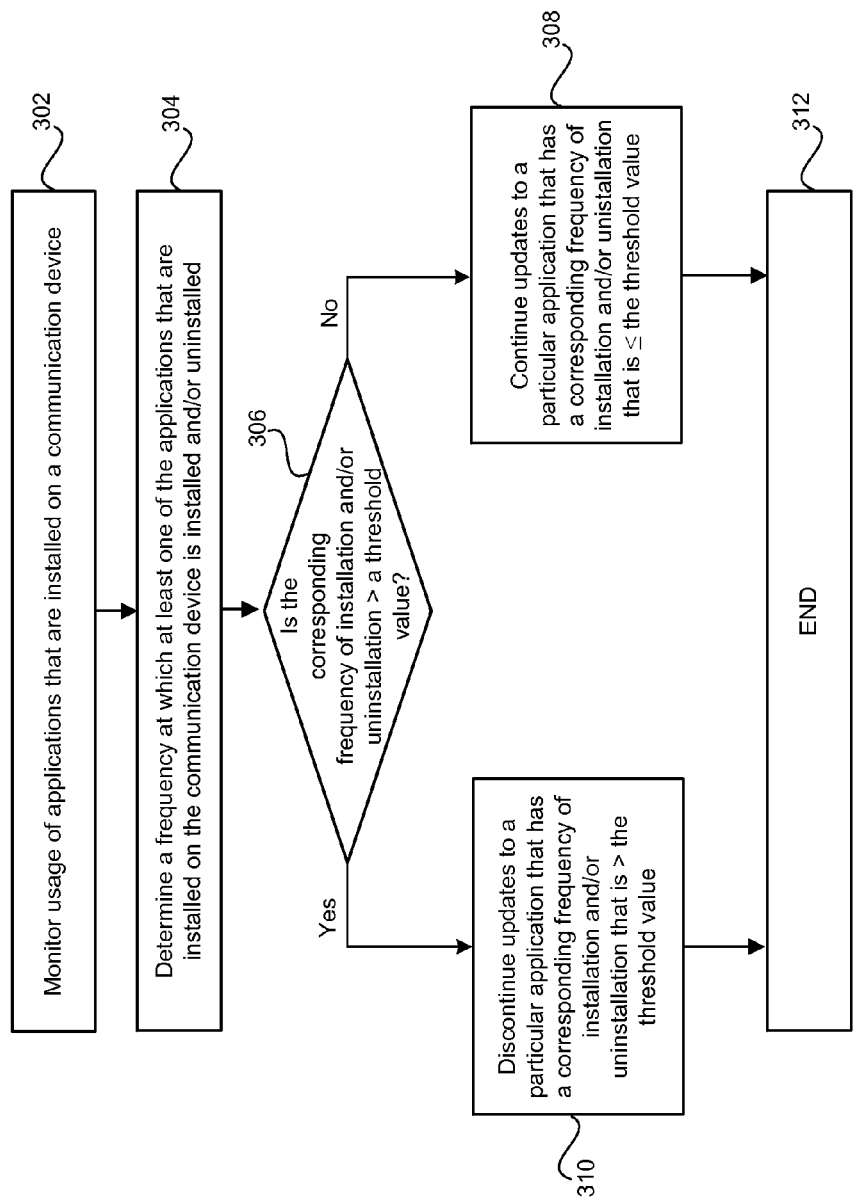
FIG. 3 is a flow chart that illustrates example steps for stopping distribution of application updates, in accordance with an embodiment of the disclosure.

FIG. 3 is a flow chart that illustrates example steps for stopping distribution of application updates, in accordance with an embodiment of the disclosure. Referring to FIG. 3, there are shown example steps 302-312. In step 302, the usage of applications that are installed on a communication device may be monitored. In step 304, a frequency at which at least one of the applications that are installed on the communication device is installed and/or uninstalled may be determined based on the monitoring. In step 306, it may be determined whether the corresponding frequency of installation and/or uninstallation for a particular application is greater than a threshold value. If in step 306, it is determined that the corresponding frequency of installation and/or uninstallation for a particular application is not greater than the threshold value, then in step 308, updates to that particular application are continued. If in step 306, it is determined that the corresponding frequency of installation and/or uninstallation for a particular application is greater than the threshold value, then in step 310, updates to that particular application are discontinued. The end step 312 follows the example steps 308 and 310.

In various embodiments of the disclosure, a mobile communication device 202 is operable to determine whether an application that is installed on the mobile communication device 202 should be updated based on an uninstall and/or reinstall history of the application on the mobile communication device 202 and/or an uninstall and/or reinstall history of the application on other communication devices that may be utilized by a user of the mobile communication device 202. The processor 208 in the mobile communication device 202 may be operable to control the distribution of updates to the installed application based on the determination. The processor 208 may be operable to monitor usage of the application on the mobile communication device 202 and/or the other communication devices that may be utilized by a user, and based on the monitored usage, the processor 208 may be operable to determine a frequency at which the application is uninstalled and/or reinstalled on the mobile communication device 202.

In various embodiment of the disclosure, the processor 208 may be operable to discontinue distribution of the updates to the application if the determined frequency at which the application is uninstalled and/or reinstalled on the mobile communication device 202 and/or the other communication devices that may be utilized by a user, exceeds a particular threshold. The processor 208 may also be operable to continue distribution of the updates to the application if the determined frequency at which the installed application is uninstalled and/or reinstalled on the mobile communication device 202 and/or the other communication devices that may be utilized by a user, is below the particular threshold. The processor 208 may be operable to compare a version number of the installed application to a version number for a corresponding application that is stored on a remote server such as the store application server 230 in order to determine when the update to the application is available for distribution to the mobile communication device 202.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "example" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Other embodiments of the disclosure may provide a machine or computer readable device, having stored thereon, a machine code and/or a computer program having at least one code section executable by a machine and/or a computer, thereby causing the machine and/or computer to perform the steps as described herein for stopping distribution of application updates.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the modules enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
    on a communication device:
        determining, by a processor, whether an application that is installed on said communication device should be updated based on whether a frequency at which said application is at least one of uninstalled and reinstalled exceeds a threshold; and
        controlling distribution of updates to said installed application based on said determining.

2. The method according to claim 1, comprising monitoring usage of said application on at least one of said communication device and other communication devices utilized by a user of said communication device.

3. The method according to claim 2, comprising determining based on said monitored usage, a frequency at which said application is at least one of uninstalled and reinstalled on at least one of said communication device and said other communication devices utilized by said user.

4. The method according to claim 3, comprising discontinuing said distribution of said updates to said application if said frequency at which said application is at least one of uninstalled and reinstalled on at least one of said communication device and said other communication devices utilized by said user exceeds a particular threshold.

5. The method according to claim 3, comprising continuing said distribution of said updates to said application if said frequency at which said installed application is at least one of uninstalled and reinstalled on at least one of said communication device and said other communication devices utilized by said user is below said particular threshold.

6. The method according to claim 1, comprising determining when said update to said application is available for said distribution.

7. The method according to claim 6, comprising comparing a version number of said installed application to a corresponding version number for said application that is stored on a remote server to determine when said update to said application is available for said distribution.

8. A system, comprising:
    a processor on a communication device, said processor being operable to:
        determine whether an application that is installed on said communication device should be updated based on whether a frequency at which said application is at least one of uninstalled and reinstalled exceeds a threshold; and
        control distribution of updates to said installed application based on said determining.

9. The system according to claim 8, wherein said processor is operable to monitor usage of said application on at least one of said communication device and other communication devices utilized by a user of said communication device.

10. The system according to claim 9, wherein said processor is operable to determine based on said monitored usage, a frequency at which said application is at least one of uninstalled and reinstalled on at least one of said communication device and said other communication devices utilized by said user.

11. The system according to claim 10, wherein said processor is operable to discontinue said distribution of said updates to said application if said frequency at which said application is one or both of uninstalled and reinstalled on at least one of said communication device and said other communication devices utilized by said user exceeds a particular threshold.

12. The system according to claim 10, wherein said processor is operable to continue said distribution of said updates to said application if said frequency at which said installed application is one or both of uninstalled and reinstalled on at least one of said communication device and said other communication devices utilized by said user is below said particular threshold.

13. The system according to claim 10, wherein said processor is operable to determine when said update to said application is available for said distribution.

14. The system according to claim 13, wherein said processor is operable to compare a version number of said installed application to a corresponding version number for said application that is stored on a remote server to determine when said update to said application is available for said distribution.

15. A non-transitory computer readable device having stored thereon, a computer program having at least one code section, the at least one code section being executable by a communication device for causing the communication device to perform steps comprising:
    determining whether an application that is installed on said communication device should be updated based on whether a frequency at which said application is at least one of uninstalled and reinstalled exceeds a threshold; and
    controlling distribution of updates to said installed application based on said determining.

16. The computer readable device according to claim 15, wherein said at least one code section is operable to monitor usage of said application on at least one of said communication device and other communication devices utilized by a user of said communication device.

17. The computer readable device according to claim 16, wherein said at least one code section is operable to determine based on said monitored usage, a frequency at which said application is one of uninstalled and reinstalled on at least one of said communication device and said other communication devices utilized by said user of said communication device.

18. The computer readable device according to claim 17, wherein said at least one code section is operable to discontinue said distribution of said updates to said application if said frequency at which said application is at least one of uninstalled and reinstalled on at least one of said communication device and said other communication devices utilized by said user exceeds a particular threshold.

19. The computer readable device according to claim 17, wherein said at least one code section is operable to continue said distribution of said updates to said application if said frequency at which said installed application is at least one of uninstalled and reinstalled on at least one of said communication device and said other communication devices utilized by said user is below said particular threshold.

20. The computer readable device according to claim 15, wherein said at least one code section is operable to determine when said update to said application is available for said distribution.

21. The computer readable device according to claim 20, wherein said at least one code section is operable to compare a version number of said installed application to a corresponding version number for said application that is stored on a remote server to determine when said update to said application is available for said distribution.

* * * * *